(12) United States Patent
Matsumoto et al.

(10) Patent No.: US 9,862,800 B2
(45) Date of Patent: Jan. 9, 2018

(54) POLYARYLATE RESIN

(71) Applicant: UNITIKA LTD., Amagasaki-shi, Hyogo (JP)

(72) Inventors: Chiho Matsumoto, Uji (JP); Takamasa Akizuki, Uji (JP)

(73) Assignee: UNITIKA LTD., Amagasaki-Shi (JP)

( * ) Notice: Subject to any disclaimer, the term of this patent is extended or adjusted under 35 U.S.C. 154(b) by 56 days.

(21) Appl. No.: 14/906,410

(22) PCT Filed: Aug. 8, 2014

(86) PCT No.: PCT/JP2014/071017
§ 371 (c)(1),
(2) Date: Jan. 20, 2016

(87) PCT Pub. No.: WO2015/022915
PCT Pub. Date: Feb. 19, 2015

(65) Prior Publication Data
US 2016/0159975 A1    Jun. 9, 2016

(30) Foreign Application Priority Data

Aug. 13, 2013 (JP) .................................. 2013-168192

(51) Int. Cl.
| C08G 63/193 | (2006.01) |
| C08J 3/11 | (2006.01) |
| C08G 63/195 | (2006.01) |
| C08G 63/40 | (2006.01) |
| C08G 63/181 | (2006.01) |

(52) U.S. Cl.
CPC ......... *C08G 63/193* (2013.01); *C08G 63/181* (2013.01); *C08G 63/195* (2013.01); *C08G 63/40* (2013.01); *C08J 3/11* (2013.01); *C08J 2367/03* (2013.01)

(58) Field of Classification Search
None
See application file for complete search history.

(56) References Cited

U.S. PATENT DOCUMENTS

| 5,902,872 A | 5/1999 | Kishimoto et al. |
| 2010/0188749 A1 | 7/2010 | Hirayama et al. |

FOREIGN PATENT DOCUMENTS

| CN | 101548208 A | 9/2009 |
| EP | 0884342 A1 | 12/1998 |
| JP | 56-88424 A | 7/1981 |
| JP | 5-43670 A | 2/1993 |
| JP | 11-209687 A | 8/1999 |
| JP | 2000-1530 A | 1/2000 |
| JP | 2000-119593 A | 4/2000 |
| JP | 2000-136234 A | 5/2000 |
| JP | 2000-143787 A | 5/2000 |
| JP | 2000-159870 A | 6/2000 |
| JP | 2000-159871 A | 6/2000 |
| JP | 2000-273160 A | 10/2000 |
| JP | 2000-302853 | * 10/2000 |
| JP | 2000-302853 A | 10/2000 |
| JP | 2001-59019 A | 3/2001 |
| JP | 2006-328147 | * 12/2006 |
| JP | 2007-217502 | * 8/2007 |
| JP | 2009-35624 | * 2/2009 |
| JP | 2009-86604 A | 4/2009 |
| WO | WO 2014/115746 A1 | 7/2014 |

OTHER PUBLICATIONS

International Search Report, issued in PCT/JP2014/071017, dated Nov. 11, 2014.
International Preliminary Report on Patentability and Written Opinion of the International Searching Authority (Forms PCT/IB/338, PCT/IB/326, PCT/IB/373 and PCT/ISA/237) for International Application No. PCT/JP2014/071017, dated Feb. 25, 2016, with an English translation.
The First Office Action issued in the corresponding Chinese Patent Application No. 201480044988.X dated Sep. 2, 2016.
European Patent Office Communication and extended search report issued in the corresponding European Patent Application No. 14835765.0 dated Mar. 14, 2017.
Taiwanese Office Action (including a partial English translation thereof) issued in the corresponding Taiwanese Patent Application No. 103127594 dated Sep. 4, 2017.

* cited by examiner

*Primary Examiner* — Tae H Yoon
(74) *Attorney, Agent, or Firm* — Birch, Stewart, Kolasch & Birch, LLP

(57) ABSTRACT

An object of the present invention is to provide a polyarylate resin having an adequate ultraviolet-absorbing property and an adequate dissolving property in an organic solvent, which is excellent in a solution stability even when it is dissolved in a polar organic solvent having a high hygroscopic property and in a reactivity with the other material and adhesive properties to various materials. The present invention provides a polyarylate resin comprising a bisphenol component including a compound shown by a general formula (1) and an aromatic dicarboxylic acid component as monomeric components, wherein the polyarylate resin is satisfied with the formula mentioned below:

$\eta B/\eta A \leq 0.95$ (wherein ηA represents an inherent viscosity measured in a concentration of 1 g/dL and a temperature of 25° C. using tetrachloroethane as a solvent and ηB represents an inherent viscosity measured in a concentration of 1 g/dL and a temperature of 25° C. using a mixture liquid of phenol/tetrachloroethane/sodium acetate having a mass ratio of 6/4/0.006 as a solvent):

[chemical formula 1]

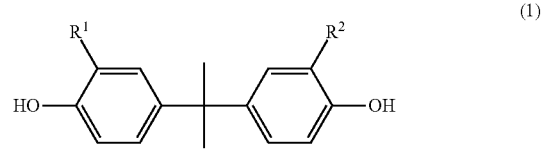

(1)

(wherein R1 and R2 respectively and independently represent an alkyl group.).

8 Claims, No Drawings

POLYARYLATE RESIN

CROSS REFERENCE TO RELATED APPLICATIONS

This application is the National Phase of PCT International Application No. PCT/JP2014/071017, filed on Aug. 8, 2014, which claims priority under 35 U.S.C. 119(a) to Patent Application No. 2013-168192, filed in Japan on Aug. 13, 2013, all of which are hereby expressly incorporated by reference into the present application.

TECHNICAL FIELD

The present invention relates to a polyarylate resin.

BACKGROUND ART

A polyarylate resin is a polyester containing a bisphenol component and an aromatic dicarboxylic acid component as monomeric components. Because a polyarylate resin is excellent in transparency, heat resistance and mechanical strength, it is used as optical parts, protective films, electrical and electronic parts, etc. In these applications, a need for performing wet spinning, coating and spraying from a resin solution as a method of processing resin has been increasing in order to comply with a demand of weight saving and reduction in thickness of polyarylate resin products. For this reason, a polyarylate resin is required to have a dissolving property and a solution stability to an organic solvent. However, the most general polyarylate resin using 2,2-bis (4-hydroxyphenyl)propane as a bisphenol component has been problematic in that a dissolving property and a solution stability to an organic solvent are insufficient.

An attempt has been made to obtain a polyarylate resin with a dissolving property and a solution stability to an organic solvent improved by using a bisphenol in which the 3-position, or the 3-position and 5-position of a benzene ring are substituted as the bisphenol component. For example, Patent Document 1 discloses the technique of obtaining a polyarylate resin which is excellent in preservation stability of a coating liquid when a solvent such as methylene chloride is used, with the use of 2,2-bis(3-methyl-4-hydroxyphenyl)propane and a specified polymerization catalyst. Patent Document 2 discloses the technique of obtaining a polyarylate resin using a bisphenol in which the 3-position and 5-position of a benzene ring are substituted. However, the polyarylate resins obtained by these techniques have a new problem that a reactivity with the other material and adhesive properties to various materials are insufficient. If the adhesive properties of the polyarylate resin to various materials are insufficient, in both the case where the polyarylate resin is used as a film material and the case where the polyarylate resin is used as a substrate material on which a film is formed, the film is easily peeled. When a bisphenol is used in which the 3-position and 5-position of a benzene ring are substituted, there is also a problem that an ultraviolet-absorbing property manifested by photo Fries rearrangement reaction of the polyarylate resin is deteriorated. If the ultraviolet absorbing property is deteriorated, ultraviolet rays which enter an optical part formed from the polyarylate resin may permeate the polyarylate resin to degenerate the inside of the optical part or a side opposite to the irradiation surface.

On the other hand, it is known that a polyarylate resin obtained by interface polymerization includes an acid anhydride bond "—C(=O)—O—C(=O)—" generated by a dehydrochlorination reaction between an acid chloride and a carboxyl group generated by hydrolysis of the acid chloride. It has been previously known the technique of adjusting the amount of the acid anhydride bond contained in the polyarylate resin for improving compatibility with the other resin during kneading in the molten state (Patent Document 3). However, when the polyarylate resin using 2,2-bis(4-hydroxyphenyl)propane described in Patent Document 3 is dissolved in a polar organic solvent having a high hygroscopic property, such as N-methylpyrrolidone, to be used, an acid anhydride bond in the resin is hydrolyzed by moisture derived from moisture absorption, so that there is a problem of lowering a solution stability. If the solution stability of the polyarylate resin is lowered in a polar organic solvent having a high hygroscopic property, insolubles are generated in the solution due to preservation in the solution form, so that transparency and smoothness of a film obtained by using the solution are lowered.

Accordingly, in the prior art, a polyarylate resin has not yet been obtained which is excellent in all of an ultraviolet-absorbing property, a dissolving property in an organic solvent, a solution stability in a polar organic solvent having a high hygroscopic property, a reactivity with the other material and adhesive properties to various materials.

PRIOR ART DOCUMENT

Patent Documents

Patent Document 1: JP-A-H11-209687
Patent Document 2: JP-A-H05-43670
Patent Document 3: JP-A-S56-88424

SUMMARY OF THE INVENTION

Technical Problems

The present invention has been made to solve the above problems, and an object of the present invention is to provide a polyarylate resin having an adequate ultraviolet-absorbing property and an adequate dissolving property in an organic solvent, which is excellent in a solution stability even when it is dissolved in a polar organic solvent having a high hygroscopic property and in a reactivity with the other material and adhesive properties to various materials.

Solution to Problems

The present inventors have intensively studied repeatedly in order solve the above problems, and as a result, have found that the object is achieved by setting the ratio of inherent viscosity ($\eta_B/\eta_A$) to a specified range in a polyarylate resin containing, as a bisphenol component, a compound shown by a general formula (1) described later having an alkyl group only at the 3-position of a benzene ring of a bisphenol, and have reached the present invention.

That is, the gist of the present invention is as follows:
A polyarylate resin comprising a bisphenol component including a compound shown by a general formula (1) and an aromatic dicarboxylic acid component as monomeric components, wherein the polyarylate resin is satisfied with the formula (A) mentioned below:

$$\eta_B/\eta_A \leq 0.95 \tag{A}$$

(wherein $\eta_A$ represents an inherent viscosity measured in a concentration of 1 g/dL and a temperature of 25° C. using tetrachloroethane as a solvent and $\eta_B$ represents an inherent viscosity measured in a concentration of 1 g/dL and a temperature of 25° C. using a mixed liquid of phenol/tetrachloroethane/sodium acetate having a mass ratio of 6/4/0.006 as a solvent):

[chemical formula 1]

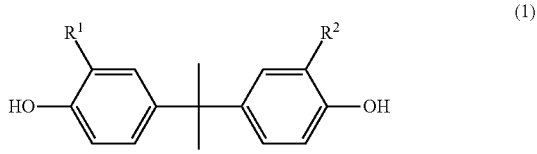

(1)

(wherein R¹ and R² respectively and independently represent an alkyl group.).

The polyarylate resin, wherein the polyarylate resin has an acid value of 40 eq/ton or less, after being dissolved in N-methylpyrrolidone containing 1% by mass of water at a concentration of 50 g/L and heat-treated at 80° C. for 3 hours.

A resin solution comprising the polyarylate resin dissolved in an organic solvent.

Effects of Invention

The present invention can provide a polyarylate resin having an adequate ultraviolet-absorbing property and an adequate dissolving property in an organic solvent, which is excellent in a solution stability even when it is dissolved in a polar organic solvent having a high hygroscopic property and in a reactivity with the other material. The polyarylate resin of the present invention is excellent in a reactivity with the other material and adhesive properties to various materials.

DESCRIPTION OF EMBODIMENTS

The present invention will be described in detail below.

The polyarylate resin of the present invention is composed of a bisphenol component and an aromatic dicarboxylic acid component as monomeric components.

The bisphenol component necessarily includes the compound shown by the general formula (1) having an alkyl group only at the 3-position of a benzene ring of a bisphenol.

In the general formula (1), R¹ and R² respectively and independently represent an alkyl group. Examples of the alkyl group include hydrocarbon groups, particularly saturated hydrocarbon groups, having 1 to 6 carbon atoms, preferably saturated hydrocarbon groups having 1 to 4 carbon atoms. It is desirable that R¹ and R² are respectively and independently, preferably simultaneously, a methyl group, an ethyl group, a propyl group or a butyl group.

Examples of the compound shown by the general formula (1) include 2,2-bis(3-methyl-4-hydroxyphenyl)propane [hereinafter, may be referred to as BisC], 2,2-bis(3-ethyl-4-hydroxyphenyl)propane and 2,2-bis(3-tert-butyl-4-hydroxyphenyl)propane.

The bisphenol component preferably includes the compound shown by the general formula (1) in an amount of 90 mol % or more, and more preferably 95 mol % or more based on the total amount of the bisphenol component. If the bisphenol component does not include the compound shown by the general formula (1), a solution stability in a polar organic solvent having a high hygroscopic property (hereinafter, may be simply referred to as solution stability) and a dissolving property in an organic solvent (hereinafter, may be simply referred to as dissolving property) may be lowered, or an ultraviolet-absorbing property and adhesive properties to various materials may be lowered, so that this is not preferable. For example, if the bisphenol component includes a bisphenol such as 2,2-bis(4-hydroxyphenyl)propane [hereinafter, may be referred to as BisA] in place of the compound shown by the general formula (1), a solution stability and a dissolving property are lowered. For example, if the bisphenol component includes a bisphenol having an alkyl group at the 3-position and 5-position of a bisphenol such as 2,2-bis(3,5-dimethyl-4-hydroxyphenyl)propane [hereinafter, may be referred to as TABMPA] in place of the compound shown by the general formula (1), an ultraviolet-absorbing property and adhesive properties to various materials are lowered.

The bisphenol component may include the other bisphenol other than the compound shown by the general formula (1) in such a range that the effect of the present invention is not impaired. Examples of the other bisphenol include BisA, TMBPA, 9,9-bis(3-methyl-4-hydroxyphenyl)fluorene, 1,1-bis(4-hydroxyphenyl)-1-phenylethane, 1,1-bis(4-hydroxyphenyl)cyclohexane, 1,1-bis(4-hydroxyphenyl)ethane, 1,1-bis(3,5-dimethyl-4-hydroxyphenyl)ethane, 1,1-bis(3-methyl-4-hydroxyphenyl)ethane, bis(4-hydroxyphenyl)methane, bis(3,5-dimethyl-4-hydroxyphenyl)methane, bis(3-methyl-4-hydroxyphenyl)methane, 1,1-bis(4-hydroxyphenyl)hexane and 1,1-bis(3,5-dimethyl-4-hydroxyphenyl)hexane. The content of the other bisphenol is preferably less than 10 mol %, more preferably 5 mol % or less, and further preferably substantially zero in the bisphenol component from the viewpoint of further improvement in an ultraviolet-absorbing property, a dissolving property and a solution stability.

Examples of the aromatic dicarboxylic acid component include phthalic acids such as terephthalic acid, isophthalic acid and orthophthalic acid; phthalic acid derivatives such as terephthalic acid and isophthalic acid in which one or two alkyl groups selected from the group consisting of a methyl group, an ethyl group, a n-propyl group, an isopropyl group, a n-butyl group, an isobutyl group, a sec-butyl group and a tert-butyl group are substituted; biphenyldicarboxylic acids such as 4,4'-biphenyldicarboxylic acid [BPDC] and 2,2'-biphenyldicarboxylic acid; naphthalenedicarboxylic acids such as 1,5-naphthalenedicarboxylic acid and 2,6-naphthalenedicarboxylic acid; diphenyl ether dicarboxylic acids such as diphenyl ether-2,2'-dicarboxylic acid, diphenyl ether-2,3'-dicarboxylic acid, diphenyl ether-2,4'-dicarboxylic acid, diphenyl ether-3,3'-dicarboxylic acid, diphenyl ether-3,4'-dicarboxylic acid and diphenyl ether-4,4'-dicarboxylic acid. From the viewpoint of mechanical strength, it is preferable to include an aromatic dicarboxylic acid component selected from phthalic acids and biphenyldicarboxylic acids, particularly terephthalic acid and isophthalic acid. The aromatic dicarboxylic acid component includes phthalic acids and biphenyldicarboxylic acids, particularly terephthalic acid and isophthalic acid in a total amount of preferably 90 mol % or more, and more preferably 95 mol % or more based on the total amount of the aromatic dicarboxylic acid component. From the viewpoint of a solution stability and a dissolving property, the molar ratio of terephthalic acid to isophthalic acid (terephthalic acid/isophthalic acid) is preferably 7/3 to 3/7, and more preferably 6/4 to 4/6.

In the present invention, the polyarylate resin may include the other component such as an aliphatic diol, an alicyclic diol, an aliphatic dicarboxylic acid and an alicyclic dicarboxylic acid as a monomeric component, in addition to the bisphenol component and the aromatic dicarboxylic acid component, in such a range that the effect of the present invention is not impaired. Examples of the aliphatic diol include ethylene glycol and propylene glycol. Examples of the alicyclic diol include 1,4-cyclohexanediol, 1,3-cyclohexanediol and 1,2-cyclohexanediol. Examples of the aliphatic dicarboxylic acid include adipic acid and sebacic acid. Examples of the alicyclic dicarboxylic acid include 1,4-cyclohexanedicarboxylic acid, 1,3-cyclohexanedicarboxylic acid and 1,2-cyclohexanedicarboxylic acid. The content of the other component is preferably less than 10 mol %, and more preferably substantially zero, with respect to the total mole number of raw material monomers.

The polyarylate resin of the present invention is required to satisfy the formula (A), and from the viewpoint of further improvement in adhesive properties to various materials, the polyarylate resin preferably satisfies the formula (B), and more preferably satisfies the formula (C).

$$\eta_B/\eta_A \leq 0.95 \quad (A)$$

$$\eta_B/\eta_A \leq 0.90 \quad (B)$$

$$\eta_B/\eta_A \leq 0.88 \quad (C)$$

$\eta_A$ represents an inherent viscosity measured in a concentration of 1 g/dL and a temperature of 25° C. using tetrachloroethane as a solvent, and $\eta_B$ represents an inherent viscosity measured in a concentration of 1 g/dL and a temperature of 25° C. using a mixed liquid of phenol/tetrachloroethane/sodium acetate at a mass ratio of 6/4/0.006 as a solvent.

If the value of $\eta_B/\eta_A$ exceeds a reactivity with the other material and adhesive properties to various materials are remarkably lowered, so that this is not preferable.

The lower limit value of $\eta_B/\eta_A$ is not particularly limited, but is preferably 0.75 or more, and particularly preferably 0.85 or more from the viewpoint of further improvement in a solution stability and a dissolving property.

From the viewpoint of the balance between adhesive properties, a solution stability, a dissolving property and an ultraviolet-absorbing property, the most preferable range of $\eta_B/\eta_A$ is 0.88 to 0.95.

The value of $\eta_B/\eta_A$ is an index of the rate of an acid anhydride bond in a polyarylate resin. If an acid anhydride bond is contained in a polymer structure, sodium acetate cleaves the acid anhydride bond in a solvent containing sodium acetate, so that the molecular weight of the polyarylate resin is reduced. Accordingly, the larger the amount of the acid anhydride bond included in the polyarylate resin is, the smaller the value of $\eta_B$ based on the solvent containing sodium acetate with respect to $\eta_A$ based on the solvent containing no sodium acetate becomes. In other words, the smaller the value of $\eta_B/\eta_A$ is, the larger the amount of the acid anhydride bond included in the polyarylate resin becomes.

The value of $\eta_B/\eta_A$ in the polyarylate resin can be controlled by adjusting the equivalent ratio of the total of hydroxyl groups/the total of carboxyl groups at polymerization of the polyarylate resin.

For example, if the equivalent ratio of the total of hydroxyl groups/the total of carboxyl groups increases, the value of $\eta_B/\eta_A$ becomes larger. On the other hand, if the equivalent ratio decreases, the value of $\eta_B/\eta_A$ becomes smaller. The equivalent ratio of the total of hydroxyl groups/the total of carboxyl groups is usually 100.0/100.6 to 100.0/101.3, preferably 100.0/100.7 to 100.0/101.1, and more preferably 100.0/100.9 to 100.0/101.1. If the equivalent ratio is too small, the value of $\eta_B/\eta_A$ is smaller than the defined range, and if the equivalent ratio is too large, the value of $\eta_B/\eta_A$ is larger than the defined range.

The equivalent ratio of the total of hydroxyl groups/the total of carboxyl groups is the ratio of the total number of hydroxyl groups included in all monomeric components used at polymerization/the total number of carboxyl groups included in all monomeric components used at polymerization. If a terminal blocking agent described later is used at polymerization, the terminal blocking agent is included in the monomeric component. An alkaline compound itself does not constitute the polyarylate resin, so that it is not included in the monomeric component.

$\eta_A$ is usually 0.90 to 1.20, preferably 1.00 to 1.20, and more preferably 1.05 to 1.20.

$\eta_B$ is usually 0.70 to 1.15, preferably 0.75 to 1.15, and more preferably 0.90 to 1.15.

The polyarylate resin of the present invention has an acid value after being dissolved in NMP containing 1% by mass of water at a concentration of 50 g/L and heat-treated at 80° C. for 3 hours (hereinafter, referred to as "acid value after treatment") of usually 50 eq/ton or less, preferably 40 eq/ton or less, and particularly preferably 35 eq/ton or less, from the viewpoint of a solution stability and a dissolving Property. The lower limit value of the acid value after treatment of the polyarylate resin is not particularly limited, but the acid value after treatment is usually 20 eq/ton or more, and preferably 25 eq/ton or more. The most preferable acid value after treatment of the polyarylate resin is 25 to 30 eq/ton.

In the polyarylate resin of the present invention, a difference in the acid value before and after heat treatment at 80° C. for 3 hours in the state where the polyarylate resin is dissolved in NMP containing 1% by mass of water at a concentration of 50 g/L (hereinafter, referred to as "acid value difference before and after treatment") is an index of hydrolyzability of the polyarylate resin. A larger acid value difference before and after treatment indicates high hydrolyzability, and a smaller acid value difference before and after treatment indicates low hydrolyzability. The lower the hydrolyzability is, the more excellent a solution stability in a polar organic solvent having a high hygroscopic property and a dissolving property in an organic solvent are. The acid value difference before and after treatment of the polyarylate resin is usually 15 eq/ton or more, preferably 20 eq/ton or more, and particularly preferably 25 eq/ton or more, from the viewpoint of a reactivity with the other material and adhesive properties to various materials. The upper limit value of the acid value difference before and after treatment of the polyarylate resin is not particularly limited, but the acid value difference is usually 40 eq/ton or less, and preferably 36 eq/ton or less. The most preferable acid value difference before and after treatment of the polyarylate resin is 20 to 25 eq/ton.

In order for the polyarylate resin of the present invention to satisfy the formula (A) and for the acid value after treatment and the acid value difference before and after treatment to fall within the above ranges, respectively, the equivalent ratio of the total of hydroxyl groups/the total of carboxyl groups at polymerization of the polyarylate resin should be controlled within the above range in the production method described later.

The smaller contact angle of water with respect to a surface of the polyarylate resin of the present invention is preferable from the viewpoint of a coatability of an aqueous coating agent. The contact angle is usually 70 to 82°, preferably 70 to 79°, and more preferably 70 to 77°. The contact angle is a value obtained by measuring the contact angle of water with respect to a planar film produced from a polyarylate resin solution by the method described later.

The polyarylate resin of the present invention can be produced by an interface polymerization method. An example of the interface polymerization method includes a method of mixing a solution including an aromatic dicarboxylic acid component dissolved in an organic solvent incompatible with water (organic phase) into an aqueous alkali solution containing at least a bisphenol component and a polymerization catalyst, and preferably further containing a terminal blocking agent (aqueous phase); and performing a polymerization reaction with stirring at a temperature of 50° C. or lower for 1 to 8 hours. The aromatic dicarboxylic acid component is usually used in the form of halide.

The solvent used for the organic phase is preferably a solvent which is incompatible with water and dissolves the polyarylate resin. Examples of the solvent include methylene chloride and chloroform, and methylene chloride is preferable because of ease of use in production.

Examples of the aqueous alkali solution used for the aqueous phase include aqueous solutions of alkaline compounds such as sodium hydroxide and potassium hydroxide.

Examples of the terminal blocking agent include a monohydric phenol, a monovalent acid chloride, a monohydric alcohol and a monovalent carboxylic acid. Examples of the monohydric phenol include phenol, o-cresol, m-cresol, p-cresol, p-tert-butylphenol [PTBP], o-phenylphenol, m-phenylphenol, p-phenylphenol, o-methoxyphenol, m-methoxyphenol, p-methoxyphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl)propane, 2-phenyl-2-(2-hydroxyphenyl)propane and 2-phenyl-2-(3-hydroxyphenyl)propane. Examples of the monovalent acid chloride include benzoyl chloride, chloride benzoate, methanesulfonyl chloride and phenyl chloroformate. Examples of the monohydric alcohol include methanol, ethanol, n-propanol, isopropanol, n-butanol, 2-butanol, pentanol, hexanol, dodecyl alcohol, stearyl alcohol, benzyl alcohol and phenethyl alcohol. Examples of the monovalent carboxylic acid include acetic acid, propionic acid, octanoic acid, cyclohexanecarboxylic acid, benzoic acid, toluic acid, phenylacetic acid, p-tert-butylbenzoic acid and p-methoxyphenylacetic acid. Among them, PTBP is preferable due to a high heat stability.

Examples of the polymerization catalyst include quaternary ammonium salts such as tri-n-butylbenzylammonium halide, tetra-n-butylammonium halide, trimethylbenzylammonium halide and triethylbenzylammonium halide; and quaternary phosphonium salts such as tri-n-butylbenzylphosphonium halide, tetra-n-butylphosphonium halide, trimethylbenzylphosphonium halide and triethylbenzylphosphonium halide. Among them, tri-n-butylbenzylammonium halide, trimethylbenzylammonium halide, tetra-n-butylammonium halide, tri-n-butylbenzylphosphonium halide and tetra-n-butylphosphonium halide are preferable because a polymer having a high molecular weight and a low terminal acid value can be obtained.

The polyarylate resin of the present invention can be dissolved in an organic solvent to be suitably used as a resin solution. Examples of the organic solvent for dissolving the polyarylate resin include N-methylpyrrolidone (NMP), dimethylformamide, methylene chloride, 1,2-dichloroethane, chloroform, carbon tetrachloride, chlorobenzene, 1,1,2,2-tetrachloroethane, 1,1,1-trichloroethane, o-dichlorobenzene, m-dichlorobenzene, p-dichlorobenzene, toluene, benzene, xylene, tetrahydrofuran (THF), 1,4-dioxane and 1,3-dioxolane. Among them, NMP, dimethylformamide, toluene, benzene, xylene, THF, 1,4-dioxane and 1,3-dioxolane are preferable, and NMP is more preferable from the viewpoint of halogen free.

The polyarylate resin of the present invention is excellent in a reactivity with the other material. Examples of the other material include other polymers such as an epoxy resin, a polyimide, a polyamide and a polyester, and organic compounds having a relatively low molecular weight such as a light-resistant stabilizer, a heat-resistant stabilizer, a flame retardant and a surface modifier.

The polyarylate resin of the present invention is also excellent in adhesive properties to various materials. The polyarylate resin of the present invention is excellent in adhesive properties to, particularly, metals such as aluminum and copper, and resins such as a polyacrylic resin.

The polyarylate resin of the present invention can exert excellent adhesive properties in the case where the polyarylate resin is used as a coating material, and also in the case where the polyarylate resin is used as a material of a substrate on which a film is formed.

The polyarylate resin of the present invention is excellent in a solution stability even when it is dissolved in a polar organic solvent having a high hygroscopic property. For this reason, the polyarylate resin of the present invention can react with the aforementioned other material in the polar organic solvent, or can be suitably used as a paint, a coating agent, an adhesive or a cast film. The polar organic solvent having a high hygroscopic property is a polar organic solvent which has water miscibility to the extent that transparency can be maintained, even when water is added at 1% by mass based on the total amount and mixed therein. Examples of the polar organic solvent include NMP, THF, 1,4-dioxane and 1,3-dioxolane.

EXAMPLES

Hereinafter, the present invention will be specifically described by way of Examples and Comparative Examples, but the present invention is not limited thereby. The physical properties of a polyarylate resin were measured by the following methods.

(1) Inherent Viscosity ($\eta_A$)

A polyarylate resin was dissolved in 1,1,2,2-tetrachloroethane to prepare a sample solution having a concentration of 1 g/dL. Subsequently, the falling time of the sample solution and that of the solvent were measured at a temperature of 25° C. using an Ubbelohde-type viscometer, and the inherent viscosity ($\eta_A$) was determined using the following formula.

$$\text{Inherent viscosity} = [\ln(\text{falling time of sample solution/falling time of only solvent})]/\text{resin concentration (g/dL)}$$

(2) Inherent Viscosity ($\eta_B$)

The inherent viscosity ($\eta_B$) was measured in the same operation as in $\eta_A$ except that "1,1,2,2-tetrachloroethane" was changed to "a mixture liquid of phenol/tetrachloroethane/sodium acetate having a mass ratio of 6/4/0.006".

(3) Solution Stability

A polyarylate resin was dissolved in any one of solvents of NMP, 1,4-dioxane and THF which contain 1% by mass of water at room temperature (25° C.) to prepare a resin solution having a concentration of 50 g/L. The resin solution was heated at 80° C. for 3 hours in the case of NMP or 1,4-dioxane, or at 55° C. for 3 hours in the case of THF, and allowed to stand still for 10 days after the temperature was returned to room temperature. The resulting resin solution was evaluated based on the following criteria.

○: Transparent;
Δ: Clouded (practically no problem);
x: Insolubles were precipitated.

(4) Dissolving Property

A polyarylate resin was dissolved in toluene at room temperature (25° C.) to prepare a resin solution having a concentration of 50 g/L. This resin solution was evaluated as it was based on the following criteria.

○: Transparent;
x: There were insolubles.

(5) Acid Value

A polyarylate resin (0.3 g) was dissolved in methylene chloride (20 mL), phenol red was added thereto as an indicator, and the solution was titrated with a 0.1N potassium hydroxide-benzyl alcohol solution to determine an acid value before heat treatment.

The resin solution obtained in (3) was added to methanol dropwise, the precipitated polymer was filtered and dried to give a polyarylate resin, and the resulting polyarylate resin was also subjected to measurement as described above to determine an acid value after heat treatment.

(6) Intraviolet-Absorbing Property (Transmittance of Resin Film at Wavelength of 380 nm)

Chloroform (85 parts by mass) was added to a polyarylate resin (15 parts by mass) to obtain a resin solution.

The resulting resin solution was used to form a coating film on a PET film. After air-dried at room temperature, the coating film was peeled from the PET film, and dried at 150° C. for 24 hours under reduced pressure to prepare a film having a thickness of 100 μm.

After one surface of the resulting film was irradiated with ultraviolet rays having an illuminance of 1 mW/cm$^2$ for one week using a light box (manufactured by Sunhayato Corporation) equipped with three chemical lamps FL10BL (manufactured by TOSHIBA Lighting & Technology Corporation), the light transmittance at a wavelength of 380 nm was measured in accordance with JISK0115, using a spectrophotometer UV-1700 manufactured by Shimadzu Corporation.

In the transmittance at a wavelength of 380 nm, the range of less than 10% is a range having no practical problem, the range of less than a preferable range, and the range of less than 1% is a more preferable range.

(7) Contact Angle

Chloroform (85 parts by mass) was added to a polyarylate resin (15 parts by mass), and the materials were stirred for dissolution at room temperature 25° C., to thereby obtain a polymer solution having a polymer concentration of 15% by mass. The resulting resin solution was used to form a coating film on a PET film. After air-dried at room temperature, the coating film was peeled from the PET film, and dried at 150° C. for 24 hours under reduced pressure to prepare a film having a thickness of 100 μm. The contact angle was measured in accordance with JIS R 3257 by adding pure water to the resulting polyarylate film dropwise under an environment of 20° C.×50% RH using a contact angle meter CA-D'PA type manufactured by Kyowa Interface Science Co., LTD. The smaller the contact angle is, the higher a wettability is, so that a coatability of an aqueous coating agent etc. becomes good.

(8) Adhesive Property (8-1)

NMP (90 parts by mass) was added to a polyarylate resin (10 parts by mass), and the materials were stirred for dissolution at room temperature 25° C., to thereby obtain a polymer solution having a polymer concentration of 10% by mass. Then, this polymer solution was applied onto various substrates as a base material. After a surface of the substrate was defatted with acetone in advance, the substrate was set on a film formation machine 542-AB manufactured by Yasuda Seiki seisakusho LTD., and the solution was applied onto a substrate surface with a Baker-type applicator. The substrate used is as follows: a matte side of a soft aluminum foil (Sumikei Aluminum Foil Co., Ltd., thickness 80 μm) or an electrolytic copper foil (Fukuda Metal Foil & Powder Co., Ltd.). The applied solution was air-dried at room temperature for 10 minutes, and subjected to preliminary drying at 90° C. for 3 minutes. Thereafter, main drying was performed at 200° C. for 10 minutes to form a transparent dried coat having a thickness of about 4 μm on the substrate.

(8-2)

Chloroform (85 parts by mass) was added to a polyarylate resin (15 parts by mass), and the materials were stirred for dissolution at room temperature 25° C., to thereby obtain a polymer solution having a polymer concentration of 15% by mass. The resulting resin solution was used to form a coating film on a PET film. After air-dried at room temperature, the coating film was peeled from the PET film, and dried at 150° C. for 24 hours under reduced pressure to prepare a film having a thickness of 100 μm. An acrylic emulsion CE-6400 (DIC Corporation) was applied onto the resulting film with a wire bar No. 5, and dried at 100° C. for 15 minutes to form a coat having a thickness of 5 μm.

(8-3)

In the samples obtained in (8-1) and (8-2), the coat was slit to the depth reaching the substrate by using a cutter knife. The cut surface of the sample obtained in (8-1) is a polyarylate resin-coat surface, and the cut surface of the sample obtained in (8-2) is an acrylic resin-coat surface. The slits were arranged in a lattice pattern having a length of 10 mm and an interval of 1 mm, and 100 squares were formed. A Sellotape™ (width 12 mm) made by Nichiban Co., Ltd. was attached onto the thus prepared cut surface, rubbed from the above to be sufficiently attached thereonto, and thereafter peeled upwardly from the substrate at an angle of 90°. The state of the thus tape-peeled coat of the sample was visually observed to confirm the number (N) of not peeled squares (maximum 100, minimum 0). The larger this number (N) is, the more excellent an adhesive property is. In the number N, the range of 70 or more is a range having no practical problem, the range of 80 or more is a preferable range, and the range of 85 or more is a more preferable range.

Example 1

Into a reactor equipped with a stirring device were charged 100.00 parts by mass of BisC as a bisphenol component, 0.9929 parts by mass of PTBP as a terminal blocking agent, 40.9 parts by mass of sodium hydroxide (NaOH) as an alkali, and 1.66 parts by mass of a 50 mass % aqueous solution of tri-n-butylbenzylammonium chloride (TBBAC) as a polymerization catalyst, and the materials were dissolved in 2640 parts by mass of water (aqueous phase). Separately, 80.35 parts by mass of MPC (isophthalic acid chloride/terephthalic acid chloride=1/1 (molar ratio) mixture) was dissolved in 2020 parts by mass of methylene chloride (organic phase) (BisC:PTBP:MPC:TBBAC: NaOH=99.16:1.68:100.60:0.68:260 (molar ratio)). The aqueous phase was stirred in advance, the organic phase was added into the aqueous phase under strong stirring, and the mixture was subjected to polymerization by an interface polymerization method at 15° C. for 2 hours. Thereafter, stirring was stopped, and decantation was performed to separate the aqueous phase and the organic phase. After removal of the aqueous phase, 500 parts by mass of methylene chloride, 3000 parts by mass of pure water, and 10 parts by mass of acetic acid were added to stop the reaction, and the reaction mixture was stirred at 15° C. for 30 minutes. Thereafter, the organic phase was washed with pure water 10 times, and the organic phase was added into methanol to precipitate a polymer. The precipitated polymer was filtered, and thereafter dried at 120° C. for 12 hours under vacuum to obtain a polyarylate resin.

Examples 2 to 5 and Comparative Examples 1 to 3

Polyarylate resins were obtained in the same operation as in Example 1 except that the kind and compositional ratio of the monomers were changed as shown in Table 1.

TABLE 1

| | Composition (molar ratio) | | | | Equivalent ratio of total of hydroxyl groups/total of carboxyl groups |
|---|---|---|---|---|---|
| | Bisphenol component | Terminal blocking agent PTBP | Aromatic dicarboxylic acid component MPC | | BPDC | |
| Example 1 | BisC 99.16 | 1.68 | 100.60 | — | 100.0/100.6 |
| Example 2 | BisC 99.16 | 1.68 | 100.80 | — | 100.0/100.8 |
| Example 3 | BisC 99.16 | 1.68 | 101.00 | — | 100.0/101.0 |
| Example 4 | BisC 99.16 | 1.68 | 101.20 | — | 100.0/101.2 |
| Example 5 | BisC 99.16 | 1.68 | — | 100.60 | 100.0/100.6 |
| Comparative Example 1 | BiSC 99.16 | 1.68 | 100.00 | — | 100.0/100.0 |
| Comparative Example 2 | TMBPA 99.16 | 1.68 | 100.60 | — | 100.0/100.6 |
| Comparative Example 3 | BisA 99.16 | 1.68 | 100.60 | — | 100.0/100.6 |

TABLE 2

| | Inherent viscosity | | | Solution stability | | | Dissolving property | Acid value (eq/ton) | | Transmittance (%) | Contact angle (°) | Adhesive property | | |
|---|---|---|---|---|---|---|---|---|---|---|---|---|---|---|
| | | | | | | | | Before heat treatment | After heat treatment | | | | | |
| | ηA | ηB | ηB/ηA | NMP | 1,4-Dioxane | THF | Toluene | | | | | Aluminum | Copper | Acrylic resin |
| Example 1 | 1.06 | 1.01 | 0.95 | ○ | ○ | ○ | ○ | 7 | 28 | <1 | 80 | 72 | 70 | 75 |
| Example 2 | 1.05 | 0.95 | 0.90 | ○ | ○ | ○ | ○ | 7 | 29 | <1 | 78 | 82 | 81 | 83 |
| Example 3 | 1.02 | 0.88 | 0.86 | ○ | ○ | ○ | ○ | 7 | 35 | <1 | 75 | 87 | 86 | 86 |
| Example 4 | 1.01 | 0.79 | 0.78 | Δ | Δ | Δ | ○ | 9 | 45 | <1 | 72 | 90 | 90 | 92 |
| Example 5 | 1.20 | 1.14 | 0.95 | ○ | ○ | ○ | ○ | 8 | 30 | <1 | 81 | 71 | 70 | 73 |
| Comparative Example 1 | 1.10 | 1.08 | 0.98 | ○ | ○ | ○ | ○ | 7 | 21 | <1 | 85 | 54 | 55 | 56 |
| Comparative Example 2 | 1.04 | 0.98 | 0.94 | ○ | ○ | ○ | ○ | 7 | 25 | 40 | 80 | 65 | 63 | 65 |
| Comparative Example 3 | 1.03 | 0.98 | 0.95 | x | x | x | x | 7 | 42 | <1 | 81 | 72 | 71 | 71 |

In the polyarylate resins of Examples 1 to 5, a specified amount of a specified monomer was used as a bisphenol component, and $\eta_B/\eta_A$ was controlled in a specified range. Accordingly, adhesive properties to various materials and a dissolving property in an organic solvent were excellent, and even when these polyarylate resins were dissolved in a polar organic solvent a having high hygroscopic property, a solution stability was excellent.

The polyarylate resin of Comparative Example 1 had a $\eta_B/\eta_A$ of exceeding 0.95, so that an adhesive property was not good.

In the polyarylate resin of Comparative Example 2, a specified monomer was not used, but TMBPA was used as a bisphenol component, so that the transmittance of ultraviolet rays at a wavelength of 380 nm was high, and an adhesive property was also insufficient.

In the polyarylate resin of Comparative Example 3, a specified monomer was not used, but BisA was used as a bisphenol component, so that even when $\eta_B/\eta_A$ was controlled in a specified range, the acid value after treatment was high and a solution stability when the polyarylate resin was dissolved in a polar organic solvent having a high hygroscopic property was low.

INDUSTRIAL APPLICABILITY

The polyarylate resin of the present invention, is useful as a binder for paints, a binder for coating agents, and a binder for adhesives. The polyarylate resin of the present invention is also useful as a cast film. The polyarylate resin of the present invention is in particular excellent in an abrasion resistance which the polyarylate resin inherently has.

The invention claimed is:

1. A polyarylate resin comprising a bisphenol component including a compound shown by a general formula (1), an aromatic dicarboxylic acid component and a terminal blocking agent as monomeric components, wherein the polyarylate resin is satisfied with the formula (A) mentioned below:

$$0.75 \leq \eta_B/\eta_A \leq 0.90 \tag{A}$$

wherein $\eta_A$ represents an inherent viscosity measured in a concentration of 1 g/dL and a temperature of 25° C. using tetrachloroethane as a solvent and $\eta_B$ represents an inherent viscosity measured in a concentration of 1 g/dL and a temperature of 25° C. using a mixed liquid of phenol/tetrachloroethane/sodium acetate having a mass ratio of 6/4/0.006 as a solvent;

[chemical formula 1]

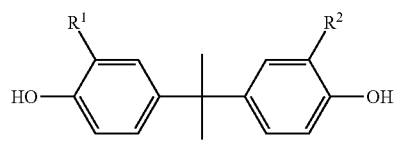

(1)

wherein $R^1$ and $R^2$ respectively and independently represent a methyl group.

2. The polyarylate resin of claim 1, wherein the polyarylate resin has an acid value of 40 eq/ton or less, after being dissolved in N-methylpyrrolidone containing 1% by mass of water at a concentration of 50 g/L and heat-treated at 80° C. for 3 hours.

3. A resin solution comprising the polyarylate resin according to claim 1 dissolved in an organic solvent.

4. A resin solution comprising the polyarylate resin according to claim 2 dissolved in an organic solvent.

5. The polyarylate resin of claim 1, wherein the equivalent ratio of the total of hydroxyl groups/the total of carboxyl groups at polymerization of the polyarylate resin is 100.0/100.7 to 100.0/101.1.

6. The polyarylate resin of claim 2, wherein the equivalent ratio of the total of hydroxyl groups/the total of carboxyl groups at polymerization of the polyarylate resin is 100.0/100.7 to 100.0/101.1.

7. A resin solution comprising the polyarylate resin according to claim 5 dissolved in an organic solvent.

8. A resin solution comprising the polyarylate resin according to claim 6 dissolved in an organic solvent.

\* \* \* \* \*